United States Patent [19]

Guarnery et al.

[11] 4,246,298

[45] Jan. 20, 1981

[54] RAPID CURING OF EPOXY RESIN COATING COMPOSITIONS BY COMBINATION OF PHOTOINITIATION AND CONTROLLED HEAT APPLICATION

[75] Inventors: Joseph M. Guarnery, Libertyville, Ill.; William R. Watt, Princeton Junction, N.J.

[73] Assignee: American Can Company, Greenwich, Conn.

[21] Appl. No.: 20,515

[22] Filed: Mar. 14, 1979

[51] Int. Cl.³ .............................................. B05D 3/06
[52] U.S. Cl. ................................. 427/46; 204/159.11; 427/54.1; 427/55; 427/386; 528/89
[58] Field of Search ....................... 427/54, 45, 46, 55, 427/386; 204/159.11; 528/89

[56] References Cited

U.S. PATENT DOCUMENTS

| | | | |
|---|---|---|---|
| 3,709,861 | 1/1973 | Anderson | 204/159.11 |
| 3,711,391 | 1/1973 | Feinberg | 204/159.11 |
| 3,816,278 | 6/1974 | Watt | 204/159.11 |
| 4,069,055 | 1/1978 | Crivello | 204/159.11 |

*Primary Examiner*—John H. Newsome
*Attorney, Agent, or Firm*—Robert P. Auber; Stuart S. Bowie; Peter L. Costas

[57] ABSTRACT

A method for the high speed coating of various substrates utilizes an epoxy composition containing a radiation-sensitive catalyst precursor which will decompose upon exposure to electromagnetic radiation to provide a Lewis acid effective to induce cationic polymerization of the epoxy composition. The formulation does not require any special epoxy monomeric materials or accelerators and is stable until so exposed. Subsequent to applying the formulation to the substrate, the coating is exposed to electromagnetic radiation and a controlled temperature of 50°–90° C. is maintained in the coating for a limited period of time to effect polymerization of the formulation to a tack free surface condition within a period of less than 30 seconds. Maintenance at the elevated temperature following initiation of irradiation may be for a period of as little as 0.5 second.

14 Claims, No Drawings

RAPID CURING OF EPOXY RESIN COATING COMPOSITIONS BY COMBINATION OF PHOTOINITIATION AND CONTROLLED HEAT APPLICATION

BACKGROUND OF THE INVENTION

For a number of years the coating industry has been engaged in substantial developmental programs in the quest for procedures which would allow the coating of substrates at high production rates with the coating being cured to a tack-free condition at a speed commensurate with the contiguous processing steps. The industry has desired to eliminate the volatile solvents required in many of the well known coating processes because of potential hazards or because of the cost of equipment to handle the evolved solvent vapors. In addition, the industry has been seeking coating formulations which would produce coatings which were durable and which would permit substantial additional processing of the workpiece, such as metal forming operations where the substrate is metal strip and container bodies, blanks and closures.

Epoxy coating formulations have long been recognized as affording desirable properties in the finished coating, especially the toughness to withstand further processing. However, the problem has remained to develop a low cost epoxy coating formulation which would combine the desired rheological properties for the coating application with both reasonable pot life and rapid curing in the production line.

In Watt United States Letters Pat. No. 3,794,576 granted Feb. 26, 1974, there are described desirable epoxy formulations which combine the desired rheological properties with suitable pot life and rapid curing. The formulations contain a Lewis acid precursor catalyst which is decomposed upon irradiation by ultraviolet light to produce rapid curing of the coating to a tack free condition. However, to achieve the desired rapid curing, the epoxide formulations therein contain at least about 15 percent by weight of an epoxidic ester having two epoxycycloalkyl groups; such esters materially increase the cost of the formulation as compared with the more conventional epoxide prepolymer materials.

Since the disclosure of Watt, a number of patents and publications have appeared proposing various catalyst precursors for the epoxy formulations which could replace the diazonium catalysts specifically described in the Watt Patent. Among these are the onium catalysts disclosed in Barton United States Letters Pat. No. 4,090,936 granted May 23, 1978; Crivello U.S. Letters Pat. Nos. 4,069,055 granted Jan. 17, 1978 and No. 4,058,401 granted Nov. 15, 1977. However, the search has continued for low cost formulations which would cure rapidly, i.e., formulations which would not require even small amounts of special components such as the epoxidic esters of the Watt Patent.

Although it has long been known that heat will accelerate the reaction rate of polymerization following irradiation to effect complete curing, generally in accordance with the Arrhenius equation, and has long been suggested to augment the irradiation treatment (see, for example, the aforementioned Watt Patent at Column 6, lines 1-16), such heating has also been recognized to introduce other problems in the form of production requirements and possible adverse effects upon the polymer properties since low molecular weight polymers may result. Some researchers have evaluated various factors affecting cure rate in such irradiated epoxide formulations and have proposed substantially elevated temperatures to increase the cure rate while avoiding volatilization of the monomer (See, Crivello et al, "Triaryl Sulfonium Salts: A New Class of Photoinitiators for Cationic Polymerization", JOURNAL OF RADIATION CURING, Volume 5, pages 2, 10-11, January 1978).

Although elevated temperatures of 100° C. and above would appear to be advantageous in terms of acceleration of reaction rate, such temperatures have been found to substantially affect the quality of the polymeric coating although no monomer or volatile component may be driven off during the process. Moreover, elevation of the coating to such temperatures and maintenance thereat for any appreciable length of time presents substantial production problems when high speed processing is involved.

Accordingly, it is an object of the present invention to provide a process for coating substrates with relatively low cost epoxy prepolymer formulations which are activated by irradiation and which will produce a tack free surface condition rapidly for use on high speed production equipment.

It is also an object to provide such a process which permits the utilization of relatively low cost epoxy prepolymers and a wide range of ultraviolet sensitive catalyst precursors.

Another object is to provide such a process which may be adapted to a wide variety of high speed coating lines and which does not require extensive or expensive equipment.

SUMMARY OF THE INVENTION

It has now been found that the foregoing and related objects may be readily attained in a method in which there is applied to the substrate a fluid coating of a polymerizable composition comprising at least one epoxidic prepolymer material polymerizable to a higher molecular weight at which it is tack-free and up to 5 percent by weight of a radiation-sensitive catalyst precursor which decomposes upon exposure to electromagnetic radiation to provide a Lewis acid effective to initiate polymerization of the epoxidic prepolymer material. The catalyst precursor is ineffective to cure the epoxidic prepolymer material to a tack-free surface condition at ambient temperatures in a period of two minutes following exposure to radiation to effect its decomposition. The epoxidic prepolymer material contains less than about 15 percent by weight thereof of epoxidic prepolymer material having two epoxycycloalkyl groups per molecule.

The coating is exposed to electromagnetic radiation to effect decomposition of the catalyst precursor to thereby generate a Lewis acid, and the coating is maintained at a temperature of about 50°-90° C. for a period of at least 0.5 second and less than about 2 minutes following initiation of exposure to radiation. As a result, the polymerizable composition of the coating is polymerized to a substantially tack-free surface condition in a period of less than 30 seconds following the combination of exposure to radiation and maintenance of the coating at the prescribed temperature.

The preferred coating compositions are substantially free from prepolymer material having two epoxycycloalkyl groups per molecule and such prepolymer materials are conveniently glycidyl ethers of various aromatic alcohols. Conveniently, the propolymer is the reaction product of bis-phenol A and epichlorohydrin.

The catalyst precursor economically comprises less than 3 percent by weight of the polymerizable composition and is an aromatic diazonium salt or an aromatic onium salt selected from the group consisting of onium salts of group Va elements, onium salts of group VIa elements and halonium salts.

The substrate may be metallic and heating the coating to the desired temperature may be effected by induction heating of the metallic substrate. Alternatively, conduction, infrared radiation and convection may be used to heat any type of substrate and/or the coating to the desired temperature. The coating should be maintained at the prescribed temperature for a period of at least about 0.5–5 seconds, but less than about 2 minutes. Care must be taken to avoid overheating the coating since this may effect a reduction in the desired properties of the polymer.

The most convenient form of radiation to effect catalyst prepolymer decomposition is ultraviolet radiation.

DETAILED DESCRIPTION OF THE PREFERRED EMBODIMENTS

As previously indicated, the coating compositions utilized in the present invention essentially comprise a mixture of an epoxidic prepolymer material and a radiation-sensitive catalyst precursor. Other components such as pigments, dyes, fillers and diluents may be incorporated if so desired.

The epoxidic prepolymer materials which may be used herein comprise any monomeric or oligomeric material containing at least one functional epoxy group or oxirane ring so that they may be polymerized upon opening of the oxirane ring. In addition, polymeric epoxy materials may be employed if they may be dispersed in a fluid coating composition and are capable of undergoing further polymerization to produce a solid polymer coating. The epoxy compounds may be aliphatic, cycloaliphatic, aromatic or heretocyclic.

The epoxidic prepolymer should contain no functional groups more basic than the oxirane ring and should be a solvent for the catalyst precursor. Most desirably, the prepolymer should contain a reasonable percentage of epoxy compounds containing two or more epoxy groups per molecule.

The polymerizable material will be epoxide resins used either singly or in combination and will have an average epoxide value of about 0.1–1.0. The carbon chains having the epoxy groups may include additional substituents including ethers, esters halogens, phosphates, and the like, and the compounds may include other polymerizable functional groups such as acrylates and silicones.

Typical epoxy materials are readily available commercially, the most common being those which are the product of bis-phenol A with epicholorohydrin or those resulting from the reaction of epichlorohydrin with a phenol formaldehyde resin of relatively low molecular weight. Reference may be made to the HANDBOOK OF EPOXY RESINS by H. Lee and K. Neville (McGraw-Hill 1967) for various epoxides. In addition, the technical literature and patent literature both contain extensive discussions of various epoxidic prepolymer materials which are useful in the compositions of the present invention as will be demonstrated hereinafter.

In W. R. Watt U.S. Letters Pat. No. 3,794,576, granted Feb. 26, 1974, there are described radiation-sensitive epoxidic blends containing at least about 15 percent by weight of an epoxidic ester having at least two epoxycycloalkyl groups per molecule in order to achieve polymerization and curing of the composition rapidly upon exposure to ultraviolet radiation or the like. The compositions of the present invention do not require the presence of such epoxy cycloalkyl esters for polymerization and curing, and accordingly will contain less than 15 percent by weight thereof and may be totally free therefrom.

Although not essential and sometimes undesirable, the polymerizable composition may contain diluents to improve viscosity, and these diluents may be reactive such as those produced by reaction of an alcohol or a phenol with epicholorohydrin. Exemplary of reactive diluents is the reaction product of nonylphenol with epicholorohydrin. The amount of diluent may vary from zero to as much as 45 percent of the composition if a reactive diluent is employed and is preferably less than 15 percent if nonreactive diluents such as dibutylphthalate are employed.

For many applications, the composition will contain an inert pigment or dye to provide a desired coloration. Generally, such pigments and dyes will comprise less than about 40 percent by weight of the composition. For certain applications, it may be desired to include an inert filler, but such fillers may be deleterious to the desired properties for the coating and will normally comprise less than 40 percent by weight and preferably less than 15 percent by weight of the polymerizable composition.

The second essential component of the polymerizable composition is the radiation-sensitive catalyst precursor which will decompose upon exposure to electromagnetic radiation so as to provide a Lewis acid which is effective to intiate polymerization of the epoxidic prepolymer material. Various compounds exhibiting the desired photoinitiation characteristics have been discovered and are known to be effective at the present time, including the aromatic diazonium salts of complex halogenides which decompose to release a halide Lewis acid described in detail in the aforementioned Watt U.S. Letters Pat. No. 3,794,576; the diaryliodonium salts described by Crivello et al in JOURNAL OF RADIATION CURING, Vol. 4, page 2 (1977); the triarylsulfonium salts described by Crivello et al in JOURNAL OF RADIATION CURING, Vol. 5, page 2 (January 1978); the aromatic iodonium and aromatic sulfonium complex salts specifically described in Barton U.S. Letters Pat. No. 4,090,936 granted May 23, 1978; the aromatic onium salts of group Va elements described in Crivello U.S. Letters Pat. No. 4,069,055 granted Jan. 17, 1978; and the aromatic onium salts of Group VIa elements described in Crivello U.S. Letters Pat. No. 4,058,401 granted Nov. 15, 1977. Moreover, the compounds may be the bis- or tris- variants thereof. An extensive discussion of triarylsulfonium salts useful for the present invention appears in UV CURING: SCIENCE AND TECHNOLOGY edited by S. P. Pappas, Technology Marketing Corporation, Stamford, Connecticut, at pages 58 et seq.

The term "Lewis acid precursor" as used herein is intended to encompass compounds which will directly generate a Lewis acid or which will indirectly generate a Lewis acid, the Lewis acid receiving an electron pair from the oxygen of the oxirane ring to open the oxirane ring and produce a site monomer for polymerization.

Exemplary of a classic Lewis acid is phosphorus pentafluoride ($PF_5$) which will complex an electron pair, and which may be generated by a diazonium catalyst in the following reaction:

$$[Ar-N^+=N]PF_6 \rightarrow ArF + N_2 + PF_5$$

$$PF_5 + M_{(monomer)} \rightarrow M^+ PF_5^-$$

This mechanism is described in detail in the aforementioned Watt U.S. Pat. No. 3,794,576.

Exemplary of an indirectly formed Lewis acid is the mechanism postulated by Crivello et al in "Triarylsulfonium Salts: A New Class of Photoinitiators for Cationic Polymerization" in JOURNAL OF RADIATION CURING, Vol. 5, page 2 (January 1978). The authors postulate that the decomposition of the diaryl- and triaryl- sulfonium salts produce a Bronsted acid which in turn provides a proton which will function as the Lewis acid to accept electrons from the oxygen of the oxirane ring and initiate polymerization in accordance with the following mechanism:

$$ArPF_6 \xrightarrow{Solvent\ H^+} ArF + Ar + Solvent + HPF_6$$

$$HPF_6 + M_{(monomer)} \rightarrow HM^+ PF_6^-$$

Regardless of the theory of the action embraced, it is apparent that the photoinitiator is decomposing to generate in the reaction medium an electron acceptor acting as a Lewis acid to open the oxirane ring and thereby initiate cationic polymerization of the epoxidic prepolymer material. The reaction then proceeds as additional oxirane rings are opened until all of the monomer has been polymerized or until impurities interfere with the reaction mechanism.

Specific examples of the various classes of photoinitiators usable in the present invention are the following: diphenyliodonium tetrafluoroborate; di(2,4-dichlorophenyl)iodonium hexafluorophosphate; diphenyliodonium hexafluorophosphate; diphenyliodonium hexafluoroarsenate; triphenylsulfonium tetrafluoroborate; triphenylsulfonium hexafluorophosphate; tris(4-phenoxyphenyl)sulfonium hexafluorophosphate; trifluoromethyldiphenylsulfonium tetrafluoroborate; p-chlorobenzenediazonium hexafluorophosphate; 2,4-dichlorobenzenediazonium tetrafluoroborate; and p-methoxybenzenediazonium hexafluorophosphate.

The amount of the catalyst precursor may vary from as little as 0.5 percent by weight of the polymerizable composition to as much as 5.0 percent by weight thereof and is preferably on the order of 1.0–3.0 percent. If so desired, combinations of the catalyst precursor may be employed.

As indicated, the photoinitiator is decomposed into a Lewis acid by exposure to electromagnetic radiation. Although electron beam bombardment, X-ray radiation, and other similar forms of high energy radiation may be employed for this purpose, exposure to ultraviolet radiation has been found highly satisfactory and is desirable for commerical applications. The exposure to radiation normally required may be of extremely short duration, periods of about one-half to three seconds being normally adequate for most compositions depending upon the intensity of the radiation at the surface. However, for relatively thick coatings of the composition, it may be desirable to extend the period of exposure to four seconds or even more, to ensure adequate penetration of the radiation through the depth of the coating.

The coating must be maintained within a relatively narrow elevated temperature range for a period of 0.5–5.0 seconds following initiation of exposure to the electromagnetic radiation in order to achieve the desired rapid polymerization of the epoxidic prepolymer material to a tack-free surface condition within a period of less than 30 seconds. Although this elevated temperature range may extend from 50° C. to as high as 90° C., it is generally held within the range of 55°–75° C. to obtain the desired rate of polymerization while avoiding adverse effects on the resulting polymer and the desired physical properties of the coating.

The temperature of the coating may be elevated to the desired temperature range by any suitable means including induction heating when a metallic substrate is employed; conductive heating by passing or placing the coated substrate over a heated element or a source of heat to heat the substrate directly on its opposed surface; convection heating by passage of the coated strip through a heated chamber; and radiation heating by exposure of the coated strip to a source of suitable radiant heat such as infrared lamps. For convenience and for minimization of the equipment requirements, infrared radiation provided by suitable lamps is most desirably employed in conjunction with a source of the ultraviolet radiation used.

It has been found that the coating may be elevated to the desired temperature range either before or after exposure to the source of electromagnetic radiation. Moreover, the time period preceding or following exposure to the source of electromagnetic radiation is not critical so long as there is concurrently obtained activation of the catalyst precursor and maintenance of the coating within the desired temperature range for only a limited period of time, generally less than about two minutes and preferably less than about ten seconds. It is likely that a protracted period of delay following exposure to the ultraviolet radiation before bringing the coating to the desired temperature might reduce the effectiveness of the method so that desirably the two steps occur within reasonably short periods of time, i.e., one minute or less.

It has been found that the method of the present invention will effect curing of the coating to a tack-free surface condition within a period of less than 30 seconds and most generally within a period of less than 5 seconds following the occurrence of both radiation exposure and maintenance within the temperature range. This is particularly significant for high speed production lines where curing to a tack-free condition desirably occurs within two seconds or less. Full curing of the coating throughout its entire depth may continue after the time period described, particularly in the event of thicker coating deposits since the tack-free surface condition permits handling and further processing of the coated substrate.

The substrates which may be utilized in the present invention include metallic substrates such as metal strip, formed container bodies, and the like, synthetic resin substrates such as polypropylene, polyvinyl chloride strip and container bodies; fibrous substrates such as nonwoven materials formed from natural fibers, synthetic fibers or mixtures of natural fibers and synthetic fibers; woven fabrics of natural and synthetic fibers, and mixtures thereof; and laminates of the various foregoing materials. In addition, ceramic substates such as glass may also be employed.

The method of coating will normally depend upon the nature and shape of the substrate and the preceding and following production steps. Knife coating, gravure coating, spray coating, dipping and the like are all useful, depending upon the particular product involved.

The methods of the present invention are particularly applicable to various processes wherein durable coatings are desired for either aesthetic or protective purposes. They find particular advantage in the field of graphic arts because of the resistance of the coating to solvents and chemicals as well as to abrasion, because of the excellent adhesion to various surfaces including metals and because of the ability to withstand drawing and forming operations. For example, metal strip and container blanks, bodies and closures may be coated and then formed without rupturing the continuity of the coating. With some nonmetallic substrates such as synthetic resins, it may be desirable to apply a primer to improve adhesion.

Illustrative of the various aspects of the present invention are the following specific examples wherein all examples are parts by weight unless otherwise indicated.

EXAMPLE ONE

A coating formulation is prepared having the following composition:

| Component | Parts |
|---|---|
| Bis-phenol A/epichlorohydrin epoxy prepolymer material (sold by Dow Chemical under the designation DER 332) | 100.0 |
| N-butanol | 10.0 |
| Fluorocarbon surfactant (sold by Minnesota Mining & Manufacturing under the designation FC-430) | 0.5 |
| Photoinitiator solution (33% by weight p-methoxybenzene diazonium hexafluorophosphate in sulfolane) | 4.0 |
| | 114.5 |

Electrolytic tinplate is used as the substrate and is coated with a No. 4 draw bar to provide a coating of about 0.36 mil thickness. Specimens of the coated substrate are placed upon a heated stage held at a constant temperature until temperature equilibrium is obtained throughout the specimen and then the coating is exposed to ultraviolet radiation from a 360 watt General Electric UA3 mercury arc lamp for a period of 4 seconds at a distance of 4½ inches.

The time period for the surface of the coating to become tack-free is noted and, at least one hour after exposure of the coating to the ultraviolet radiation, the coating is subjected to two separate tests to determine the mechanical properties of the polymer produced thereby.

In one test, a paper tissue saturated with methylethylketone (MEK) is wrapped around the index finger and rubbed across the coating using moderate finger pressure; one complete stroke back and forth is considered "one rub". Any break or erosion of the surface of the coating is considered to represent a failure.

In the second test, the needle of a thermal mechanical analyzer is placed upon the surface of the coating and the temperature the needle elevated until the needle penetrates the coating. The temperature of penetration is indicative of the degree of cross linking and the quality of the polymeric coating.

The results of the series of tests on the aforementioned specimens are set forth in the following table:

| Cure Temp., °C. | Tack-free Time, Seconds | MEK Rubs | Softening Point, °C. |
|---|---|---|---|
| 25 | *60+ | 13 | 66 |
| 30 | 40 | 18 | 66 |
| 50 | 5 | 25 | 68 |
| 60 | 1 | 55 | 66 |
| 70 | 1 | *100+ | 66 |
| 80 | 1 | *100+ | 63 |
| 90 | 1 | 52 | 56 |
| 100 | 1 | 10 | 52 |
| 110 | 1 | 4 | 42 |
| 120 | 1 | 1 | 35 |
| 130 | no cure | 1 | 5 |

*Maximum time of observation and maximum number of rubs, respectively.

As can be seen from the foregoing test data, the coating will polymerize to a tack-free surface state within 5 seconds after irradiation at 50° C. but curing and cross linking below the surface of the coating apparently requires a more extended period based upon the low resistance to surface abrasion with MEK. At 60° C., the cure rate of the surface is still further materially improved and the resistance to surface abrasion is significantly benefitted. Within the optimum temperature range of 65°–80° C., the surface properties are very greatly improved. However, if the temperature increases above about 85° C., deterioration in properties is observable, both on the MEK rub test and on the softening point test. At 130° C., curing fails to take place. This is indicative of the criticality of the elevated temperature range at which the coating is maintained following irradiation.

EXAMPLE TWO

To evaluate the effect of substituting different epoxy monomers, a series of test formulations II-VI is prepared and tested under conditions simulating a relatively high speed production line. The substrates again comprise panels with electrolytic tinplate and the formulations are applied with a No. 5 wire rod to provide a coating equal to 95 lbs. per thousand square feet of substrate surface. The coated face of the panels is preheated to 150° F. by infrared radiation as determined by a thermal paint indicator and then irradiated with two 200 watt/inch ultraviolet lamps while the panels are being advanced at a line speed of 110 feet per minute. The time for the surface of the coating to become tack-free is noted.

| Component | Parts |
|---|---|
| FORMULATION II | |
| Low molecular weight bis-phenol A-based epoxy resin (sold under the trademark ARALDITE 6004 by Ciba-Geigy) | 63.7 |
| Aliphatic diglycidyl ether (sold under the designation RD 2 by Ciba-Geigy) | 27.2 |
| n-butanol | 3.8 |
| Silicone resin flow agent (sold under the mark SR 82 by | |

-continued

| Component | Parts |
|---|---|
| General Electric) | 1.9 |
| Photoinitiator solution (33% by weight of p-methoxybenzene diazonium hexafluorophosphate solution in sulfolane) | 3.4 |
| | 100.0 |
| Time to tack-free surface | 5 seconds |

FORMULATION III

| Component | Parts |
|---|---|
| Low molecular weight bis-phenol A-based exoxy resin (sold by Ciba-Geigy under the designation ARALDITE 6004) | 47.6 |
| Tetrafunctional aromatic epoxy resin (sold by Shell Chemicals under the designation EPON 1031) | 17.2 |
| Aliphatic digylcidyl ether (sold by Ciba-Geigy under the designation RD-2) | 15.2 |
| Aliphatic monoglycidyl ether (sold by Procter & Gamble under the designation EPOXIDE-7) | 15.2 |
| Silicone resin flow agent (sold by General Electric under the designation SR-82) | 1.9 |
| Photoinitiator solution (33% by weight p-methoxybenzene diazonium hexafluorophosphate in sulfolane) | 2.9 |
| | 100.0 |
| Time to tack-free surface | 2 seconds |

FORMULATION IV

| Component | Parts |
|---|---|
| Monomeric diglycidyl ether of bis-phenol A (sold by Celanese Corporation under the designation JD-508) | 62.9 |
| Cresyl glycidyl ether (sold by Celanese Corporation under the designation EPIREZ 5011) | 28.6 |
| n-butanol | 3.8 |
| Silicone resin flow agent (sold by General Electric under the designation SR-82) | 1.9 |
| Photoinitiator solution (33% by weight p-methoxybenzene diazonium hexafluorophosphate in sulfolane) | 2.0 |
| | 100.0 |
| Time to tack-free surface | 5 seconds |

FORMULATION V

| Component | Parts |
|---|---|
| Monomeric diglycidyl ether of bis-phenol A (sold by Celanese Corporation under the designation JD-508) | 31.3 |
| Epoxidized linseed oil (sold by Viking Chemical Co. under the designation VIKOFLEX-7190) | 62.5 |
| Silicone resin flow agent (sold by General Electric under the designation SR-82) | 2.3 |
| Photoinitiator solution (33% by weight p-methoxybenzene diazonium hexafluorophosphate in sulfolane) | 3.9 |
| | 100.0 |
| Time to tack-free surface | 3 seconds |

FORMULATION VI

| Component | Parts |
|---|---|
| Monomeric diglycidyl ether of bis-phenol A (sold by Celanese Corporation under the designation JD-508) | 53.6 |
| Aliphatic digylcidyl ether (sold by Ciba-Geigy under the designation RD-2) | 26.8 |
| Cumphenyl glycidyl ether (sold by Kenrich Chemical Company under the designation CPE) | 14.3 |
| Silicone resin flow agent (sold by General Electric under the designation SR-82) | 1.9 |
| Photoinitiator solution (33% by weight p-methoxybenzene diazonium hexafluorophosphate in sulfolane) | 3.4 |
| | 100.0 |
| Time to tack-free surface | 2 seconds |

EXAMPLE THREE

To evaluate the efficacy of the method of the present invention with different catalysts, a series of different test formulations VII–X are prepared and specimens are coated and subjects to the same conditions as set forth in Example Two. Again, the time for the suface of the coating to cure to a tack-free condition is noted.

| Component | Parts |
|---|---|
| FORMULATION VII | |
| Aliphatic diglycidyl ether (sold by Ciba-Geigy under the designation RD-2) | 44.4 |
| Monomeric diglycidyl ether of bis-phenol A (sold by Celanese Corporation under the designation JD-508) | 44.4 |
| Silicone resin flow agent (sold by General Electric under the designation SR-82) | 1.9 |
| Photoinitiator (Sold by 3M Company under the designation FC-503) | 9.3 |
| | 100.0 |

| Component | Parts |
|---|---|
| Time to tack-free surface | 2 seconds |
| FORMULATION VIII | |
| Aliphatic diglycidyl ether (sold by Ciba-Geigy under the designation RD-2) | 47.1 |
| Monomeric diglycidal ether of bis-phenol A (sold by Celanese Corporation under the designation JD-508) | 47.1 |
| Silicone resin flow agent (sold by General Electric under the designation SR-82) | 1.9 |
| Photoinitiator (Sold by General Electric Company under the designation UV Cat-14) | 3.9 |
| | 100.0 |
| Time to tack-free surface | 2 seconds |
| FORMULATION IX | |
| Aliphatic diglycidyl ether (sold by Ciba-Geigy under the designation RD-2) | 46.2 |
| Monomeric diglycidyl ether of bis-phenol A (sold by Celanese Corporation under the designation JD-508) | 46.2 |
| Silicone resin flow agent (sold by General Electric under the designation SR-82) | 1.9 |
| Bis-4(diphenylsulfonio)phenyl sulfide bis-hexafluorophosphate (Technical Grade) | 5.7 |
| | 100.0 |
| Time to tack-free surface | 2 seconds |
| FORMULATION X | |
| Aliphatic diglycidyl ether (sold by Ciba-Geigy under the designation RD-2) | 47.2 |
| Monomeric diglycidyl ether of bis-phenol A (sold by Celanese Corporation under the designation JD-508) | 47.2 |
| Silicone resin flow agent (sold by General Electric under the designation SR-82) | 2.0 |
| Photoinitiator solution (33% by weight p-methoxybenzene diazonium hexafluorophosphate in sulfolane) | 3.6 |
| | 100.0 |
| Time to tack-free surface | 2 seconds |

Thus, it can be seen from the above test data that the method of the present invention is applicable to compositions using diazonium catalyst precursors which are believed to function to generate directly Lewis acids as well as those using the sulfonium catalyst precursors which are postulated to generate first Bronsted acids and then an active hydrogen ion as the Lewis acid.

EXAMPLE FOUR

To evaluate the effectiveness of the method of the present invention with coatings of different thicknesses, a standard formulation is prepared as follows:

| Component | Parts |
|---|---|
| Monomeric diglycidyl ether of bis-phenol A (sold by Celanese Corporation under the designation JD-508) | 47.2 |
| Aliphatic diglycidyl ether (sold by Ciba-Geigy under the designation RD-2) | 47.2 |
| Silicone resin flow agent (sold by General Electric under the designation SR-82) | 2.0 |
| Photoinitiator solution (33% by weight p-methoxybenzene diazonium hexafluorophosphate in sulfolane) | 3.6 |
| | 100.0 |

Test panels are prepared and treated substantially in accordance with the procedure described in Example Two except that varying amounts of the coating formulation are applied to provide different depths of coatings. The results of the tests are set forth in the following table.

| Applied Film Weight, Mg. per 4 in$^2$ | Tack-free Time, sec. |
|---|---|
| 20 | 2 |
| 32 | 2 |
| 57 | 2 |
| 137 | 2 |

The first three specimens are found to be cured through immediately, but the last specimen continues to cure slowly over the next several minutes until cured through.

EXAMPLE FIVE

To evaluate the effect of first effecting photoinitiation of the catalyst precursor and of interposing time delays before bringing the coating to the desired temperature of 65° C., a series of test panels are prepared using the following coating formulation:

| Component | Parts |
|---|---|
| Low molecular weight bis-phenol A-based epoxy resin (sold by Ciga-Geigy under the designation ARALDITE 6004) | 56.8 |
| Aliphatic diglycidyl ether (sold by Ciba-Geigy under the designation RD-2) | 37.9 |
| Silicone resin flow agent (sold by General Electric under the designation SR-82) | 1.9 |
| Photoinitiator solution (33% by weight p-methoxybenzene diazonium hexafluorophosphate in solfolane) | 3.4 |
| | 100.0 |

Following coating, the panels are placed on a belt moving at a line speed of 110 feet per minute under a pair of 200 watt/inch ultraviolet lamps to irradiate the coating. Following irradiation, the panels are then heated to 65° C. after varying time delays, and the time to cure to a tack free surface condition is again noted. The results are set forth in the following table.

| Time Delay, Seconds | Tack-Free Time, Sec. |
| --- | --- |
| 5 | 2 |
| 10 | 2 |
| 20 | 2 |
| 30 | 2 |
| 60 | 2 |

It can be seen from the foregoing results that the sequence of irradiation and temperature elevation can be reversed and that the time frame between irradiation and temperature elevation is not critical within reasonable limits for production equipment.

From the foregoing detailed specification and examples, it is apparent that significant advantages in accelerated cure rate to a tack-free surface condition can be readily attained without excessive loss in polymer properties by a closely controlled and limited exposure to a low elevated temperature. As a result, relatively low cost epoxide formulations may be used in high speed coating applications where a tack free surface condition must be attained rapidly to permit further processing. Where the coatings are of normal thickness, curing throughout occurs simultaneously instantaneously; with relatively thick coatings, curing below the surface may continue as the coated workpiece undergoes further processing.

Having thus described the invention, we claim:

1. In a method for coating substrates with an epoxy coating material to develop a tack-free surface condition in relatively short periods of time, the steps comprising:
   A. applying to a substrate a fluid coating of a polymerizable composition comprising at least one epoxidic prepolymer material polymerizable to a higher molecular weight at which it is tack-free and up to 5 percent by weight of said polymerizable composition of a radiation-sensitive catalyst precursor which decomposes upon exposure to electromagnetic radiation to provide a Lewis acid effective to initiate polymerization of said epoxidic prepolymer material, said catalyst precursor being ineffective to cure said epoxidic prepolymer material to a tack-free surface condition at ambient temperatures in a period of two minutes following exposure to radiation to effect decomposition thereof, said epoxidic prepolymer material containing less than about 15 percent by weight thereof of epoxidic prepolymer material having two epoxycycloalkyl groups per molecule;
   B. exposing said coating to said electromagnetic radiation to effect decomposition of said catalyst precursor and thereby generate a Lewis acid; and
   C. maintaining said coating at a temperature of about 50°–90° C. for a period of at least about 0.5 second and less than about 2 minutes following initiation of said exposure to radiation to effect polymerization to a substantially tack-free surface condition in a period of less than 30 seconds following the combination of said steps of radiation exposure and temperature maintenance.

2. The method in accordance with claim 1 wherein said epoxidic prepolymer material is substantially free from epoxidic prepolymer material having two epoxycycloalkyl groups.

3. The method in accordance with claim 1 wherein said epoxidic prepolymer material is a glycidyl ether of an aromatic alcohol.

4. The method in accordance with claim 1 wherein said epoxidic prepolymer material is the reaction product of bis-phenol A and epichlorohydrin.

5. The method in accordance with claim 1 wherein the amount of said catalyst precursor is not more than 3 percent of said polymerizable composition.

6. The method in accordance with claim 1 wherein said catalyst precursor is an aromatic onium salt selected from the group consisting of onium salts of group Va elements, onium salts of group VIa elements, and halonium salts.

7. The method in accordance with claim 1 wherein said catalyst precursor is an aromatic diazonium salt.

8. The method in accordance with claim 1 wherein said substrate is metallic and heating of said coating to said temperature is effected by induction heating of said substrate.

9. The method in accordance with claim 1 wherein the heating of said coating to said temperature is effected by conduction of heat through said substrate.

10. The method in accordance with claim 1 wherein the heating of said coating to said temperature is effected by infrared radiation directed upon said coating.

11. The method in accordance with claim 1 wherein said electromagnetic radiation comprises ultraviolet radiation.

12. The method in accordance with claim 1 wherein said polymerization of said coating to a substantially tack-free surface condition occurs in a period of less than five seconds.

13. The method in accordance with claim 1 wherein said temperature at which said coating is maintained is within the range of 55°–75° C.

14. The method in accordance with claim 1 wherein said coating is maintained at said temperature for a period of less than about ten seconds following said initiation of said exposure to said radiation.

* * * * *